United States Patent [19]

Schulz et al.

[11] Patent Number: 5,284,906
[45] Date of Patent: Feb. 8, 1994

[54] PROCESS FOR THE PREPARATION OF A RUBBER HAVING POLYMER BOUND FUNCTIONALITY

[75] Inventors: Gerald O. Schulz, Stow; Dane K. Parker, Massillon, both of Ohio

[73] Assignee: The Goodyear Tire & Rubber Company, Akron, Ohio

[21] Appl. No.: 49,385

[22] Filed: Apr. 21, 1993

Related U.S. Application Data

[63] Continuation-in-part of Ser. No. 784,093, Oct. 24, 1991, abandoned, which is a continuation of Ser. No. 562,051, Aug. 2, 1990, abandoned.

[51] Int. Cl.$^5$ ................................................. C08K 5/49
[52] U.S. Cl. ................................... 524/710; 524/723; 524/773; 524/776
[58] Field of Search ............... 524/710, 723, 773, 776, 524/700

[56] References Cited

U.S. PATENT DOCUMENTS 3,950,294  4/1976  Connelly et al. ............. 260/29.6 R
4,701,507  10/1987  Mate et al. ........................ 526/208

FOREIGN PATENT DOCUMENTS 59-227934  6/1983  Japan.

Primary Examiner—John C. Bleutge
Assistant Examiner—Mark D. Sweet
Attorney, Agent, or Firm—Bruce J. Hendricks

[57] ABSTRACT

The present invention relates to a process for preparing a rubber containing polymer bound functionalities. The process comprises the emulsion polymerization at a temperature ranging from about 0° C. to about 25° C. of (a) at least one functionalized monomer that contains a polymerizable vinyl group; with (b) at least one copolymerizable conjugated diene monomer selected from the group consisting of butadiene 1,3, 2-chlorobutadiene-1,3, isoprene, piperylene and conjugated hexadienes; wherein the polymerization is conducted in the presence of from (1) from 2 to 30 parts by weight of an ionic surfactant per 100 parts by weight of organic components and (2) about 1 to about 70 parts by weight of a plasticizer based on 100 parts by weight of total monomers. Other than the water, ionic surfactant, and the copolymerizable conjugated diene, the plasticizer functions as the sole solvent agent for the functionalized monomer during the emulsion polymerization and additionally functions as a plasticizer for the final polymer product.

15 Claims, No Drawings

5,284,906

PROCESS FOR THE PREPARATION OF A RUBBER HAVING POLYMER BOUND FUNCTIONALITY

This is a continuation-in-part application of Ser. No. 07/784,093, filed Oct. 24, 1991, now abandoned, which is a continuation of Ser. No. 07/562,051, filed Aug. 2, 1990, now abandoned.

BACKGROUND OF THE INVENTION

The present invention relates to a process for preparing a rubber containing polymer bound functionalities. More specifically, the present invention relates to a process for forming a rubber comprising the emulsion polymerization at a temperature ranging from about 0° C. to 25° C. of (a) at least one functionalized monomer that contains a polymerizable vinyl group with (b) at least one copolymerizable conjugated diene monomer selected from the group consisting of butadiene-1,3, 2-chlorobutadiene 1,3, isoprene, piperylene and conjugated hexadienes; wherein the polymerization is conducted in the presence of (1) from 2 to 30 parts by weight of an ionic surfactant per 100 parts by weight of organic components and (2) from about 1 to about 70 parts by weight a plasticizer based upon 100 parts by weight of total monomers. The plasticizer functions as the sole solvent for the functionalized monomer during the cold emulsion polymerization and also as a plasticizer for the final polymer product.

Polymer bound functionalities, and especially antidegradants, have been used in rubber. Preparation of rubbers having polymer bound functionalities involves the use of copolymerizable functionalized monomers. Many of these copolymerizable monomers are polar, high melting solids which are only slightly soluble at best in the copolymerizable diene monomers typically employed to prepare rubber. And since these copolymerizable monomers have little if any solubility in water and ionic surfactants, the solubility of these chemicals limits the level to which they can be polymerized.

U.S. Pat. Nos. 3,658,769, 3,767,628 and 4,213,892 describe the preparation of compounds such as N-(4-anilinophenyl) methacrylamide and N-(4-anilinophenyl) acrylamide and the polymerization of such compounds with typical monomers. These references suggest that a solvent such as methylethyl ketone or isopropyl alcohol may be required to obtain adequate solubility of the monomers. Unfortunately, the use of cosolvents like methylethylketone (MEK) and isopropyl alcohol is limited in emulsion polymerization systems due to the tendency of these solvents to destabilize latex particles resulting in partial coagulation or the formation of multiple phases.

U.S. Pat. No. 4,521,574 discloses the use of dichloromethane (DCM) and/or tetrahydrofuran (THF) as cosolvents in an emulsion polymerization; however, DCM and THF have been determined to be a potential environmental and health concern.

U.S. Pat. No. 4,701,507 discloses the use of methyl isobutyl ketone (MIBK) as a cosolvent in an emulsion polymerization; however, MIBK is also unsuitable in many applications due to its odor and volatile nature. In addition, the use of a solubilizing cosolvent while necessary to dissolve polar, solid copolymerizable monomers in the emulsion polymerization recipe, most often will require its complete removal and economical recycle upon completion of the reaction. The steps of cosolvent addition, removal and recycle make their use inconvenient and costly.

SUMMARY OF THE INVENTION

The present invention relates to a process for the preparation of a rubber having polymer bound functionality. The process comprises the emulsion polymerization at a temperature ranging from about 0° C. to 25° C. of (a) at least one functionalized monomer that contains a polymerizable vinyl group; with (b) at least one copolymerizable conjugated diene monomer selected from the group consisting of butadiene-1,3, 2-chlorobutadiene-1,3, isoprene, piperylene and conjugated hexadienes; wherein the polymerization is conducted in the presence of from about 1 to about 70 parts by weight of a plasticizer based on 100 parts by weight of total monomers.

DETAILED DESCRIPTION OF THE INVENTION

There is disclosed a process for forming a rubber having polymer bound functionality comprising the emulsion polymerization at a temperature ranging from about 0° C. to 25° C. of:

(a) at least one functionalized monomer that contains a polymerizable vinyl group and has a moiety selected from the group consisting of antidegradants, metal deactivators, photosensitizers, pigments, synergists, catalysts, accelerators or combinations thereof; with (b) at least one copolymerizable conjugated diene monomer selected from the group consisting of butadiene- 1,3, 2-chlorobutadiene-1,3, isoprene, piperylene and conjugated hexadienes;

wherein the emulsion polymerization is conducted in the presence of (1) from 2 to 30 parts by weight of an ionic surfactant per 100 parts by weight of organic components and (2) from about 1 to about 70 parts by weight of a plasticizer based on 100 parts by weight of total monomers and said plasticizer functions as the sole solvent and dispersing agent for said functionalized monomer during the polymerization other than the water and ionic surfactant in the emulsion and said copolymerizable conjugated diene; said plasticizer being selected from:

(a) a carboxylic acid ester selected from the group consisting of diesters of triethylene glycol, dibutoxy ethoxy ethyl formate, dialkyl diether glutarate, dibutoxyethyl adipate, dibutoxyethoxyethyl adipate, di-2-ethylhexyl adipate, tetraethylene glycol diheptanoate, propylene glycol dibenzoate, dipropylene glycol dibenzoate, triethylene glycol dibenzoate, butyl octyl phthalate, dimethyl phthalate, diethyl phthalate, dibutyl phthalate, dibutoxy ethyl phthalate, di.2.ethylhexyl phthalate, tetraethylene glycol dioctoate, polyethylene glycol dioctoate, triethylene glycol di.2.ethylhexanoate, tetraethylene glycol di.2.ethylhexanoate, triethylene glycol caprate-caprylate, triethylene glycol di(caprate-caprylate), triethylene glycol dipelargonate, dibutyl sebacate, dibutoxyethyl sebacate, di.2.ethylhexyl sebacate, dioctyl sebacate, diethylene glycol mono-laurate and butoxyethyl oleate; or (b) phosphates selected from the group consisting of 2-ethylhexyl diphenyl phosphate, iso-decyldiphenyl phosphate, tri-n-butyl phosphate, tri(2.ethylhexyl) phosphate, tributoxyethyl phosphate, tricresyl phosphate, trixylenyl phosphate and trixylyl phosphate; or (c) formals selected from the group consisting of dibutoxyethoxy formal and di(butoxy-ethoxy-ethyl) formal; and (d) N-butylbenzene sulfonamide.

The preferred carboxylic acid esters are polyethylene glycol dioctoate and a diester of triethylene glycol. The preferred phosphate is tributoxyethyl phosphate.

The above plasticizers are commercially available. Representative of the carboxylic acid esters that are sold commercially are Benzoflex TM 2-45, Benzoflex TM 9-88, Benzoflex TM 50, Benzoflex TM 284 and Benzoflex TM S-358 (from Velsicol Chemical), Polycizer TM DBS, Polycizer TM DBP, Polycizer TM DOA, and Polycizer TM DOP, Natro.Flex TM BCA, Plasticizer TM SC, Polycizer TM DOS (from Harwick); Hatcol TM DOA, Hatcol TM 154 and Hatcol TM DOS (from Hatco Chemical); Kodaflex TM DBPO, Kodaflex TM DEP, Kodaflex TM DMP, Kodaflex TM DOA, Kodaflex TM DOP, Kodaflex TM DOTP, Kodaflex TM HS-3, Kodaflex TM TE6-EH and Kodaflex TM TX1B (from Eastman Chemical); Merrol TM 3810, Merrol TM 4200, Merrol TM 4226, Merrol TM 4295, Merrol TM 4700, Merrol TM 4800, Merrol TM DBS and Merrol TM DOS (from Merrand); Monoplex TM DOA and Monoplex TM DOS, PlastHall TM 325, PlastHall TM 203, PlastHall TM 200, PlastHall TM 207, Plasthall TM 226, PlastHall TM DBS, PlastHall TM DOA, PlastHall TM DIOA, PlastHall TM DOZ, PlastHall TM DOS, PlastHall TM 83SS, PlastHall TM 7006, PlastHall TM 7041, PlastHall TM 7045 and PlastHall TM 4141; TeqMeR TM 803 and TeqMeR TM 804 (from C. P. Hall); Nopalcol TM 1-L, Plastolein TM 9404TGP (from Henkel); Santicizer TM (160 from Monsanto); and SR-650 and SR-660 (from Sartomer), Flexol TM Plasticizer 4G0 (from Union Carbide).

Representative of the phosphates which are sold commercially are KP-140, Kronitex TM 50, Kronitex TM 100, TOF TM and TXP TM (from C. P. Hall), Lindol TM, Phosflex TM 179A, Phosflex TM TBEP and Phosflex TM 179C (from Harwick); Phosflex TM 179, Phosflex TM 390 and Phosflex TM T-BEP (from Stauffer Chemical); Santicizer TM 141 and Santicizer TM 148 (from Monsanto).

Representative of the formals which are sold commercially are Merrol TM 4221 (from Merrand) and TP-90B TM Plasticizer (from Morton International).

The functionalized monomers have little, if any, solubility in water and the copolymerizable conjugated diene. In addition to the water and the copolymerizable conjugated diene, the above plasticizers function as the only solvent and dispersing agent for the functionalized monomers in the cold emulsion polymerization. The plasticizer also functions as a plasticizer in the final polymer product. The level of plasticizer for use in the present invention may vary. Generally speaking, the level of plasticizer may range from about 1 to 70 parts by weight of plasticizer per 100 parts by weight of total monomer. In those instances where one desires to prepare a rubber compound which is not going to be used as a masterbatch, a range of from 2 to 10 parts by weight of plasticizer is preferred, and a range of from 2 to 5 parts by weight is particularly preferred. In those instances where one desires to prepare a masterbatch compound, a range of from 10 to 50 parts by weight of plasticizer is preferred and a range of from 20 to 40 parts by weight is particularly preferred.

Conventional cold emulsion recipes can be employed with the present invention. However, in masterbatch recipes, some restrictions and modifications may arise either from the plasticizer, the copolymerizable monomer itself, or the polymerization parameters. Conventional ionic surfactants, known in the art, including sulfonate detergents and carboxylate soaps are useful in the instant invention. The level of ionic surfactant is computed based upon the total weight of the organic components (monomers plus plasticizer) and ranges from 2 to 30 parts by weight of ionic surfactant per 100 parts by weight of organic components with 4-25 parts by weight being more preferred and 5-12 parts by weight being most preferred in the masterbatch recipes. Those skilled in the art will appreciate that these levels are higher than usually used.

In a preferred embodiment of the present invention, the functionalized monomer is dissolved in the plasticizer while heating. The temperature of the solution may range from about 50° C to about 90° C. The preferred temperature ranges from about 60° C to 80° C. The hot solution is then mixed with hot aqueous surfactant solution under shear agitation to form a stable emulsion. The emulsion is charged as the initial soap solution in the cold emulsion recipe. Therefore, according to this preferred embodiment, the functionalized monomer is combined with the plasticizer prior to being charged to the emulsion recipe containing the conjugated diene monomer.

Free radical initiator systems known in the art for low temperature polymerization are useful in the instant invention, however, some initiators which are strong oxidizing agents, such as persulfate systems, usually cannot be used with certain functionalized monomers, i.e., those functionalized monomers that contain moieties which are readily oxidizable. One example of such a functionalized monomer is N-(4-anilinophenyl) methacrylamide. Examples of free radical initiators that are useful in the process of the present invention are known as "redox" initiators, such as combinations of chelated iron salts, sodium formaldehyde sulfoxylate and organic hydroperoxides. Representative of organic hydroperoxides are cumene hydroperoxide, paramenthane hydroperoxide and tertiary butyl hydroperoxide. Many "azo" initiators, such as azobisisobutyronitrile are not suitable since they are generally used at high temperatures, however, "azo" initiators such as 2,2'-azobis(2,4-dimethyl-4-methoxyvaleronitrile) sold under the trademark Vazo ® 33W can be used.

Cold polymerization recipes are generally used. The temperature of the polymerization generally ranges from about 0° to 25° C. Preferably, the temperature of the polymerization ranges from about 5° to 20° C. with a range of from about 10° to 18° C. being particularly preferred. The cold polymerization is generally carried out to monomer conversion ranging from about 65 to 80 percent. In addition, a chain transfer agent is generally used in order to avoid excessive gel formation. Incremental addition of the comonomer(s) may be necessary for complete incorporation of the copolymerizable antidegradant. Such minor modifications are within the skill of the artisan.

The present invention permits one to incorporate various levels of polymer bound functionalities into the rubber. Representative of such functionalities include accelerators, metal deactivators, photosensitizers, pigments, synergists, catalysts, antioxidants or combinations thereof.

Examples of functionalized monomers that contains an antidegradant moiety and a polymerizable vinyl group are amides having the structural formula:

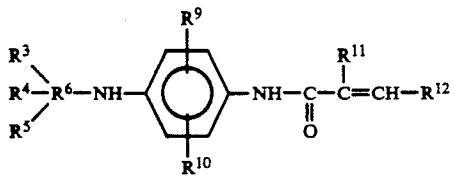

wherein R6 is an aryl radical, R$^3$ and R$^4$ are selected from the group consisting of hydrogen, alkyl radicals having from 1 to 4 carbon atoms and alkoxy radicals having from 1 to 4 carbon atoms, R$^5$ is selected from the group consisting of hydrogen, alkyl radicals having from 1 to 4 carbon atoms, alkoxy radicals having from 1 to 4 carbon atoms and a radical having the following structural formula:

wherein R$^7$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and R$^8$ is selected from the group consisting of hydrogen and alkyl radicals having from 1 to 12 carbon atoms and wherein R$^9$ and R$^{10}$ are hydrogen or alkyl radicals having from 1 to 4 carbon atoms, R$^{11}$ is selected from the group consisting of hydrogen, methyl and ethyl; and R$^{12}$ is hydrogen or phenyl. Preferably R$^3$ is hydrogen, R$^4$ is hydrogen, R$^5$ is hydrogen, R$^6$ is an aryl radical having 6 carbon atoms, R$^9$ is hydrogen, R$^{10}$ is hydrogen, R$^{11}$ is hydrogen or an alkyl having 1 carbon atom and R$^{12}$ is hydrogen.

Other examples of functionalized monomers that contain an antidegradant moiety and a polymerizable vinyl group include imides selected from the group consisting of (1) compounds having the following structural formula:

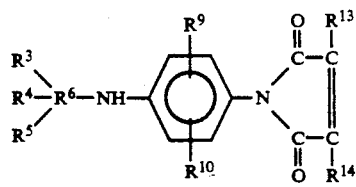

wherein R$^3$, R$^4$, R$^5$, R$^9$ and R$^{10}$ are as previously defined herein under structural formula II and wherein R$^{13}$ and R$^{14}$ are selected from the group consisting of hydrogen and alkyl radicals having from 1 to 14 carbon atoms and (2) compounds having the following structural formula:

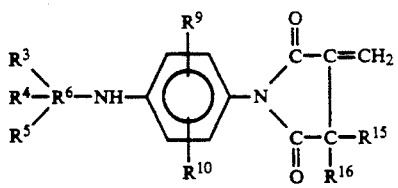

wherein R$^3$, R$^4$, R$^5$, R$^6$, R$^9$ and R$^{10}$ are as previously defined herein under structural formula I and wherein R$^{15}$ and R$^{16}$ are selected from the group consisting of hydrogen and alkyl radicals having from 1 to 4 carbon atoms. Preferably, R$^3$ is hydrogen, R$^4$ is hydrogen, R$^5$ is hydrogen, R$^6$ is an aryl having 6 carbon atoms, R$^9$ is hydrogen, R$^{10}$ is hydrogen, R$^{13}$ is hydrogen, R$^{14}$ is hydrogen, R$^{15}$ is hydrogen, and R$^{16}$ is hydrogen.

Additional examples of functionalized monomers that contain an antidegradant moiety and a polymerizable vinyl group include phenols of the structural formula:

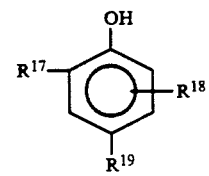

wherein R$^{17}$ and R$^{18}$ is a tert-alkyl radical having from 4 to 8 carbon atoms, R$^{19}$ is selected from the group of radicals:

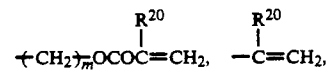

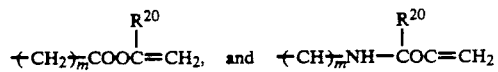

wherein R$^{20}$ is hydrogen or methyl and m is 0 to 3. Preferably, R$^{17}$ is tertiary alkyl having 4 carbon atoms, R$^{18}$ is tertiary alkyl having 4 carbon atoms, R$^{19}$ is:

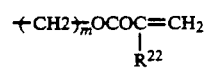

where m is 3 and R20 is methyl.

Additional functionalized monomers which contain an antidegradant moiety and a polymerizable vinyl group are compounds with the structural formula:

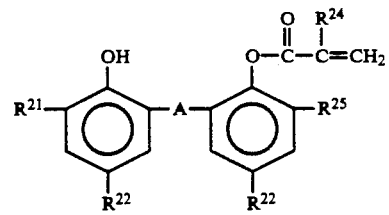

wherein R$^{21}$ and R$^{22}$ are selected from n-alkyl radicals having from 1 to 18 carbon atoms and secondary alkyl radicals having from 3 to 18 carbon atoms and t-alkyl radicals having from 4 to 8 carbon atoms; R$^{24}$ is H, CH$_3$ or C$_2$H$_5$ and A is selected from the radicals:

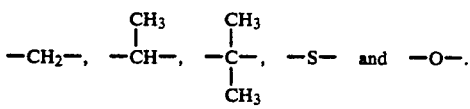

Preferably, $R^{21}$ is tert.alkyl having 4 carbon atoms, $R^{22}$ is an n-alkyl having 1 carbon atom, $R^{24}$ is hydrogen or $CH_3$ and A is —$CH_2$—.

Additional functionalized monomers which contain an antidegradant moiety and a polymerizable vinyl group are compounds with the structural formula:

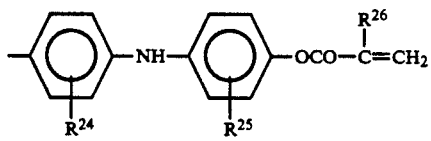

and

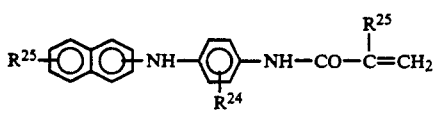

and

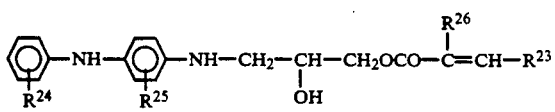

wherein each of $R^{24}$ and $R^{25}$ are alkyl radicals having from 1 to 4 carbon atoms, $R^{26}$ is hydrogen or methyl and $R^{23}$ is hydrogen or phenyl. Preferably, $R^{24}$ is hydrogen, $R^{25}$ is hydrogen, $R^{26}$ is methyl, and $R^{23}$ is hydrogen.

Examples of comonomers that are useful in the practice of this invention are conjugated diene monomers such as butadiene-1,3 2-chlorobutadiene-1,3, isoprene, piperylene and conjugated hexadienes. One may, in addition to the conjugated monomers, use a vinyl monomer such as styrene, α-methylstyrene, divinyl benzene, vinyl chloride, vinyl acetate, vinylidene chloride, methyl methacrylate, ethyl acrylate, vinyl pyridine, acrylonitrile, methacrylonitrile, methacrylic acid, itaconic acid and acrylic acid. Mixtures of different functionalized monomers and mixtures of different comonomers may be used. The monomer charge ratio by weight is normally from about 0.10/99.9 to 99.9/0.10 functionalized monomer/conjugated diene monomer (including any additional vinyl monomer. In those instances where one desires to prepare a masterbatch compound, a charge ratio by weight of about 5/95 to about 80/20 is preferred with 10/90 to 40/60 the most preferred. According to one embodiment, the weight ratio of functionalized monomer to conjugated diene monomer to styrene may range from 5:75:20 to 95:5:0. In those instances where on desires to prepare a compound which is not going to be used as a masterbatch, a charge ratio by weight of about 0.50/99.5 to 5.0/95.0 is preferred with a range of from 1.0/99.0 to 3.0/97.0 being the most preferred. Ratios will vary depending on the amount of rubber chemical functionality desired to be incorporated and on the reactivity ratios of the monomers in the particular polymerization system used.

The present invention has particular utility in preparing polymers that have polymer bound antidegradants. To afford adequate protection against degradation, the polymer should contain from about 0.5 parts to about 70 parts by weight of the segmeric form of the antidegradant per 100 parts by weight of the polymer, although if a masterbatch is desired from 10 parts to 50 parts is normally satisfactory, with from 20 parts to 40 parts being preferred. The remainder of the polymer is comprised preferably of the segmeric form derived from butadiene-1,3 or isoprene and optionally the segmeric form of styrene. Preferably, the polymers contain at least 30 percent by weight of the segmeric form of butadiene or isoprene with a range of from about 50 to about 90 percent by weight being preferred and a range of from about 60 to 80 percent by weight being particularly preferred.

The process of the present invention has significant advantage over the processes of the prior art. For example, the process of the present invention avoids the use of cosolvents such as DCM and THF which may be hazardous. Use of the present invention also avoids the need for recovery of the organic solvent. The plasticizer functioning as a co-solvent for the functionalized monomer will also provide beneficial properties in the final polymer product.

EXAMPLE 1

An emulsion was prepared by adding a hot solution (60°–80° C.) of 1.4 phm (parts per hundred monomer) of N-(4-anilinophenyl) methacrylamide and 2.4 phm of KP-140 to an aqueous solution under high shear agitation. KP-140 is tributoxyethyl phosphate and is commercially available from C. P. Hall. The aqueous solution contained 30 phm water, 3.0 phm potassium dodecylbenzene sulfonate, 0.22 phm Tamol± SN (sodium salt of condensed naphthalene sulfonic acid) and 0.10 phm tripotassium phosphate. The emulsion was then mixed with a room temperature solution of 0.15 phm tripotassium phosphate in 113 phm water and the pH adjusted to 10.0–10.4. The emulsion was charged into a quart bottle. A solution of 30 phm styrene and 0.4 phm t-dodecylmercaptan was charged, followed by the addition of 0.25 cumene hydroperoxide. 70 phm of butadiene was charged and the bottle capped. An iron activator solution (0.35 phm 3% and 0.10 phm sodium formaldehyde sulfoxylate) was syringed into the bottle. The bottle was rotated in a 18° C bath and when monomer conversion reached 69% (31% solids), a short stop solution was added (solution of 8.0 phm water, 0.10 phm sodium salt of N,N-diethyldithiocarbamate, 0.05 phm N,N-diethyl hydroxylamine and 0.22 phm potassium pyrophosphate).

The latex was filtered, stripped in a rotary evaporator to concentrate the latex. The final latex solids was 43.8%, pH 10.2 and viscosity 270 cps. There was no coagulum or throw out of N-(4.anilinophenyl) methacrylamide in the unstripped latex.

EXAMPLE 2

An emulsion was prepared by adding a hot solution (60°–80° C.) of 1.5 phm of N-(4-anilinophenyl) methacrylamide and 2.4 phm of KP 140 to an aqueous solution under agitation. The aqueous solution contained 30 phm water, 3.5 phm 39% active Siponate ™ A2466 (alpha olefin sulfonate), 1.25 phm 45% active Dowfax ™ 2A1

(sodium dodecylphenoxybenzene disulfonate), 0.20 phm 85% Tamol TM SN, 0.1 phm sodium acid pyrophosphate and 0.1 phm tetrasodium salt of EDTA. The emulsion was then mixed with a room temperature solution of 2.0 phm methacrylic acid, 0.2 phm sodium acid pyrophosphate and 113 phm water. The emulsion was charged to a quart bottle followed by addition of 28.0 phm styrene and 0.50 phm tertiary dodecylmercaptan. 0.23 phm of p-menthane hydroperoxide and 70 phm of butadiene was then charged to the bottle and the bottle capped. 0.35 phm of the same iron activator solution of Example 1 was syringed into the bottle and the bottle was rotated in a 18° C. bath. When the solids reached 31% (69% monomer conversion), the latex was shortstopped with a solution of 8.0 phm water, 1.8 phm Triton TM X-165 (octylphenoxy polyethoxy ethanol), 1.5 phm ammonium hydroxide, 0.1 phm of sodium salt of N,N-diethyldithiocarbamate and 0.05 phm N,N-diethylhydroxylamine. The final latex solids was 43.9%, pH 10.5 and viscosity 435 cps. There was no measurable coagulum before or after concentrating the latex in a rotary evaporator under vacuum nor was there N-(4-anilinophenyl)methacrylamide particles.

What is claimed is:

1. A process for forming a rubber having polymer bound functionality comprising the emulsion polymerization at a temperature ranging from about 0° C. to 25° C. of:
   (a) at least one functionalized monomer that contains a polymerizable vinyl group and has a moiety selected from the group consisting of antidegradants, metal deactivators, photosensitizers, pigments, synergists, catalysts, accelerators or combinations thereof; with
   (b) at least one copolymerizable conjugated diene monomer selected from the group consisting of butadiene-1,3, 2-chlorobutadiene-1,3, isoprene, piperylene and conjugated hexadienes;
   wherein the polymerization is conducted in the presence of (1) from 2 to 30 parts by weight of an ionic surfactant per 100 parts by weight of organic components and (2) from about 10 to about 70 parts by weight of a plasticizer based on 100 parts by weight of total monomers and said plasticizer functions as the sole solvent and dispersing agent for said functionalized monomer during the polymerization other than the water and ionic surfactant in the emulsion and said copolymerizable conjugated diene; said plasticizer being selected from:
   (a) carboxylic acid esters selected from the group consisting of diesters of triethylene glycol, dibutoxy ethoxy ethyl formate, dialkyl diether glutarate, dibutoxyethyl adipate, dibutoxyethoxyethyl adipate, di.2.ethylhexyl adipate, tetraethylene glycol diheptanoate, propylene glycol dibenzoate, dipropylene glycol dibenzoate, triethylene glycol dibenzoate, butyl octyl phthalate, dimethyl phthalate, diethyl phthalate, dibutyl phthalate, dibutoxy ethyl phthalate, di.2.ethylhexyl phthalate, tetraethylene glycol dioctoate, polyethylene glycol dioctoate, triethylene glycol di.2.ethylhexanoate, tetraethylene glycol di-2-ethylhexanoate, triethylene glycol caprate-caprylate, triethylene glycol di(caprate-caprylate), triethylene glycol dipelargonate, dibutyl sebacate, dibutoxyethyl sebacate, di.2.ethylhexyl sebacate, dioctyl sebacate, diethylene glycol mono-laurate and butoxyethyl oleate; or (b) phosphates selected from the group consisting of 2.ethylhexyl diphenyl phosphate, iso-decyldiphenyl phosphate, tri-n-butyl phosphate, tri(2.ethylhexyl) phosphate, tributoxyethyl phosphate, tricresyl phosphate, trixylenyl phosphate and trixylyl phosphate; or
   (c) formals selected from the group consisting of dibutoxyethoxy formal and di(butoxy-ethoxyethyl) formal; and
   (d) N-butylbenzene sulfonamide.

2. The process of claim 1 wherein the monomer charge ratio by weight of functionalized monomer to conjugated diene ranges from about 0.10 to 99.9 to 99.9 to 0.10.

3. The process of claim 1 wherein in addition to said functionalized monomer and said conjugated diene monomer, at least one vinyl monomer is polymerized, said vinyl monomer being selected from the group consisting of styrene, α-methylstyrene, divinylbenzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid.

4. The process of claim 3 wherein the weight ratio of functionalized monomer to conjugated diene monomer to vinyl monomer may range from 5:75:20 to 95:5:0 parts per hundred parts by weight based on total weight of monomer.

5. A process of claim 1 wherein at least one functionalized monomer is from the group consisting of (a) amides having the structural formula:

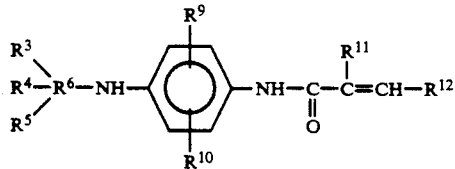

wherein $R^6$ is an aryl radical, $R^3$ and $R^4$ are selected from the group consisting of hydrogen, alkyl radicals having from 1 to 4 carbon atoms and alkoxy radicals having from 1 to 4 carbon atoms, $R^5$ is selected from the group consisting of hydrogen, alkyl radicals having from 1 to 4 carbon atoms, alkoxy radicals having from 1 to 4 carbon atoms and a radical having the following structural formula:

wherein $R^7$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^8$ is selected from the group consisting of hydrogen and alkyl radicals having from 1 to 12 carbon atoms and wherein $R^9$ and $R^{10}$ are hydrogen or alkyl radicals having from 1 to 4 carbon atoms, $R^{11}$ is selected from the group consisting of hydrogen, methyl and ethyl; and $R^{12}$ is hydrogen or phenyl; and (b) imides selected from the group consisting of (1) compounds having the following structural formula:

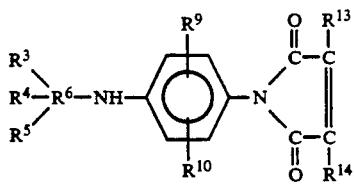

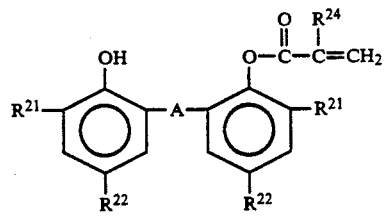

wherein $R^3$, $R^4$, $R^5$, $R^9$ and $R^{10}$ are as previously defined herein under structural formula II and wherein $R^{13}$ and $R^{14}$ are selected from the group consisting of hydrogen and alkyl radicals having from 1 to 14 carbon atoms and (2) compounds having the following structural formula:

wherein $R^{21}$ and $R^{22}$ are selected from n-alkyl radicals having from 1 to 18 carbon atoms and secondary alkyl radicals having from 3 to 18 carbon atoms and t-alkyl radicals having from 4 to 8 carbon atoms; $R^{24}$ is H, $CH_3$ or $C_2H_5$ and A is selected from the radicals:

$$-CH_2-, \quad -\underset{\underset{H}{|}}{\overset{\overset{CH_3}{|}}{C}}-, \quad -\underset{\underset{CH_3}{|}}{\overset{\overset{CH_3}{|}}{C}}-, \quad -S- \quad \text{and} \quad -O-,$$

and compounds with the structural formula:

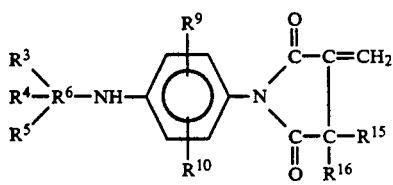

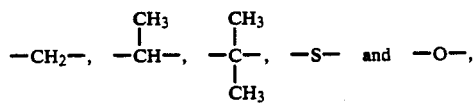

wherein $R^3$, $R^4$, $R^5$, $R^6$, $R^9$ and $R^{10}$ are as previously defined herein under structural formula I and wherein $R^{15}$ and $R^{16}$ are selected from the group consisting of hydrogen and alkyl radicals having from 1 to 4 carbon atoms.

and

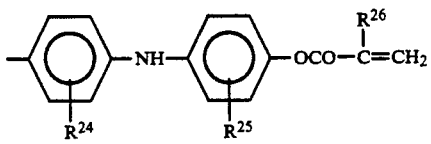

6. The process of claim 1 wherein butadiene-1,3 is used.

and

7. A process according to claim 1 wherein the functionalized monomer is selected from the group of compounds represented by the structural formula:

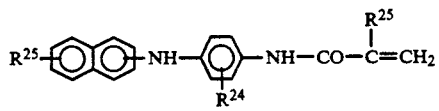

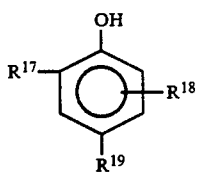

wherein each of $R^{24}$ and $R^{25}$ are alkyl radicals of 1 to 4 carbon atoms, $R^{26}$ is hydrogen or methyl and $R^{23}$ is hydrogen or phenyl.

8. The process of claim 1 wherein 10 to 50 parts by weight of plasticizer per 100 parts by weight of total monomer is used.

9. The process of claim 1 wherein 2 to 10 parts by weight of plasticizer per 100 parts by weight of total monomer is used.

wherein $R^{17}$ and $R^{18}$ is a tert-alkyl radical having from 4 to 8 carbon atoms, $R^{19}$ is selected from the group of radicals:

10. The process of claim 1 wherein an ionic surfactant is used and is present in an amount ranging from about 2 to 30 parts by weight of ionic surfactant per 100 parts by weight of organic components.

11. The process of claim 9 wherein the amount of ionic surfactant is present in an amount ranging from about 5 to 12 parts by weight of ionic surfactant per 100 parts by weight of organic components.

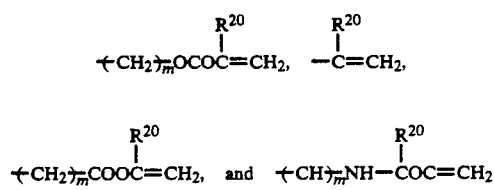

12. The process of claim 1 wherein said functionalized monomer is combined with said plasticizer and heated to a temperature of from about 50° C. to about 90° C. prior to being charged to the emulsion recipe containing the butadiene, isoprene or mixtures thereof.

13. The process of claim 1 wherein said functionalized monomer has an antidegradant moiety.

14. The process of claim 1 wherein the phosphate is tributoxyethyl phosphate.

wherein $R^{20}$ is hydrogen or methyl and m is 0 to 3 and compounds with the structural formula:

15. The process of claim 1 wherein the polymerization is at a temperature ranging from about 5° C. to 20° C.

* * * * *